US008788321B2

(12) United States Patent
Lettow, Jr. et al.

(10) Patent No.: US 8,788,321 B2
(45) Date of Patent: Jul. 22, 2014

(54) MARKETING METHOD AND SYSTEM USING DOMAIN KNOWLEDGE

(75) Inventors: Kenneth M. Lettow, Jr., Hoboken, NJ (US); John Gennaro, San Diego, CA (US)

(73) Assignee: Thomas Publishing Company, New York, NY (US)

(*) Notice: Subject to any disclaimer, the term of this patent is extended or adjusted under 35 U.S.C. 154(b) by 224 days.

(21) Appl. No.: 11/849,532

(22) Filed: Sep. 4, 2007

(65) Prior Publication Data

US 2008/0059310 A1 Mar. 6, 2008

Related U.S. Application Data

(60) Provisional application No. 60/824,499, filed on Sep. 5, 2006.

(51) Int. Cl.
*G06Q 30/00* (2012.01)
*G06Q 30/02* (2012.01)

(52) U.S. Cl.
CPC ..................... *G06Q 30/02* (2013.01)
USPC .............................. 705/14; 707/1

(58) Field of Classification Search
CPC combination set(s) only.
See application file for complete search history.

(56) References Cited

U.S. PATENT DOCUMENTS

| | | | |
|---|---|---|---|
| 5,848,396 A * | 12/1998 | Gerace | 705/10 |
| 6,006,197 A | 12/1999 | d'Eon | |
| 6,009,410 A | 12/1999 | Lemole | |
| 6,286,001 B1 | 9/2001 | Walker et al. | |
| 6,332,127 B1 * | 12/2001 | Bandera et al. | 705/14 |
| 6,360,216 B1 | 3/2002 | Hennessey et al. | |
| 6,366,298 B1 | 4/2002 | Haitsuka et al. | |
| 6,487,538 B1 * | 11/2002 | Gupta et al. | 705/14.66 |
| 6,601,100 B2 | 7/2003 | Lee et al. | |
| 6,842,782 B1 | 1/2005 | Malik et al. | |
| 6,850,900 B1 | 2/2005 | Hare et al. | |
| 6,883,032 B1 | 4/2005 | Dempski | |
| 6,904,461 B1 | 6/2005 | Randhava et al. | |
| 6,941,321 B2 | 9/2005 | Schuetze et al. | |
| 7,146,416 B1 | 12/2006 | Yoo et al. | |
| 7,181,438 B1 | 2/2007 | Szabo | |
| 7,792,844 B2 * | 9/2010 | Error et al. | 707/754 |
| 2002/0032672 A1 * | 3/2002 | Keith, Jr. | 707/2 |
| 2002/0087679 A1 | 7/2002 | Pulley et al. | |

(Continued)

FOREIGN PATENT DOCUMENTS

EP 1208446 A1 5/2002
WO WO 2006/031402 A3 3/2006

OTHER PUBLICATIONS

International Preliminary Examination Report dated Jun. 12, 2009 for PCT Patent Application No. PCT/US07/77509.

(Continued)

*Primary Examiner* — William A Brandenburg
*Assistant Examiner* — Christopher Busch
(74) *Attorney, Agent, or Firm* — Schnader Harrison Segal & Lewis LLP

(57) ABSTRACT

A method of evaluating advertising is disclosed based on analysis of user behavior in a market focused directory. Users actions are logged over a given time period. Implicit measures are derived from the log files and read into one or more databases. The implicit measures are aggregated across a plurality of user sessions and a report of the user behavior with respect to a single URL or a comparison between URLs is created.

17 Claims, 11 Drawing Sheets

(56) References Cited

U.S. PATENT DOCUMENTS

| | | | |
|---|---|---|---|
| 2002/0111847 A1* | 8/2002 | Smith, II | 705/10 |
| 2002/0147805 A1* | 10/2002 | Leshem et al. | 709/223 |
| 2002/0165849 A1* | 11/2002 | Singh et al. | 707/1 |
| 2002/0169868 A1 | 11/2002 | Lopke et al. | |
| 2002/0174421 A1 | 11/2002 | Zhao et al. | |
| 2002/0198984 A1 | 12/2002 | Goldstein et al. | |
| 2003/0033226 A1 | 2/2003 | Anderson | |
| 2003/0065576 A1* | 4/2003 | Harris et al. | 705/26 |
| 2003/0120670 A1 | 6/2003 | Nareddy et al. | |
| 2003/0126560 A1 | 7/2003 | Kurapati et al. | |
| 2004/0015714 A1 | 1/2004 | Abraham et al. | |
| 2004/0030575 A1 | 2/2004 | Fackre et al. | |
| 2004/0059632 A1* | 3/2004 | Kang et al. | 705/14 |
| 2004/0059746 A1 | 3/2004 | Error et al. | |
| 2004/0107243 A1 | 6/2004 | Tsyganskiy | |
| 2004/0122740 A1* | 6/2004 | McCarrick et al. | 705/26 |
| 2004/0199623 A1* | 10/2004 | Houri | 709/223 |
| 2004/0236650 A1 | 11/2004 | Zapiec et al. | |
| 2004/0249938 A1 | 12/2004 | Bunch | |
| 2004/0254857 A1 | 12/2004 | Onizuka | |
| 2004/0254942 A1 | 12/2004 | Error et al. | |
| 2005/0021397 A1* | 1/2005 | Cui et al. | 705/14 |
| 2005/0055269 A1 | 3/2005 | Roetter et al. | |
| 2005/0171877 A1* | 8/2005 | Weiss | 705/35 |
| 2005/0223093 A1 | 10/2005 | Hanson | |
| 2005/0246358 A1 | 11/2005 | Gross | |
| 2006/0155764 A1 | 7/2006 | Tao | |
| 2007/0043605 A1 | 2/2007 | Fisher et al. | |
| 2007/0088607 A1 | 4/2007 | Feierbach | |
| 2007/0088713 A1 | 4/2007 | Baxter et al. | |
| 2007/0100996 A1 | 5/2007 | Stebbins | |
| 2007/0124202 A1 | 5/2007 | Simons | |
| 2007/0156887 A1 | 7/2007 | Wright et al. | |

OTHER PUBLICATIONS

Response to Oct. 1, 2008 Written Opinion and Article 34 Amendments for PCT Patent Application No. PCT/US07/77509.
Written Opinion dated Oct. 1, 2008 for PCT Patent Application No. PCT/US07/77509.
European Search Report for European Patent Application 07841802.7 dated Aug. 22, 2011.
Product Description of the Thomas Register of American Manufacturer, 2006 by Thomas Publishing Company, LLC of New York (http://en.wikipedia.org/wiki/Thomas_Register).
Product Description of online database, ThomasNet, by Thomas Industrial network, 2006 (http://en.wikipedia.org/wiki/Thomas_Register).
International Search Report for PCT Patent Application PCT/US2007/077509 dated Oct. 1, 2008.
Sullivan, Danny, Using Direct Hit Popularity Results; Webpage: http://searchenginewatch.com/showPage.html?page=2165041; Sep. 12, 2002.
Fox, et al.; "Evaluating implicit measures to improve web search," *ACM Transactions on Information Systems* (*TOIS*) archive; vol. 23, Issue 2, Apr. 2005; pp. 147-168.
Claypool, et al.; "Implicit interest indicators," *International Conference on Intelligent User Interfaces archive*; Proceedings of the 6th international conference on Intelligent user interfaces table of contents; Santa Fe, NM, pp. 33-40, 2001.
Pixeltech web site access statistics facility: http://www.pixeltech.com.au/utils/accessstats/#Advanced; printed Dec. 17, 2007.
"Method for generating advertising revenue, based on real-time usage of a web service," disclosed by IBM on Jun. 1, 2000; Abstract only.
Masahiro Morita, et al; "Information filtering based on user behavior analysis and best match text retrieval;" *Proceedings of the 17th annual international ACM SIGIR conference on Research and development in information retrieval*, Jul. 1994, Dublin, Ireland, pp. 272-281.
D. M. Nichols; "Implicit Rating and Filtering;" *In Proceedings of the Fifth DELOS Workshop on Filtering and Collaborative Filtering*, Nov. 1997.
Konstan, et al.; "GroupLens: applying collaborative filtering to Usenet news;" *Commun, ACM* 40, Mar. 3, 1997, pp. 77-87.
M. Kellar, et al., "Effect of Task on Time Spent Reading as an Implicit Measure of Interest;" *ASIST* 2004, 2004, pp. 168-175.
T. Joachims, et al.; "Accurately interpreting clickthrough data as implicit feedback;" In *Proceedings of the 28th Annual international ACM SIGIR Conference on Research and Development in information Retrieval*; Salvador, Brazil; Aug. 2005). SIGIR '05. ACM Press, New York, NY; pp. 154-161.
D. Kelly, et al.; "Implicit feedback for inferring user preference: a bibliography;" *SIGIR Forum* 37, 2; Sep. 2003, pp. 18-28.
D. Oard, et al.; "Implicit feedback for recommender systems;" *In Proceedings of the AAAI Workshop on Recommender Systems*; pp. 81-83.

\* cited by examiner

| UID | userdomain | date time | user action | search for | pos | cov | duration |
|---|---|---|---|---|---|---|---|
| User A | UserDomain A | 4-17-2007 16:07:34 | Product search | lcd | | NA | 00:07 |
| User A | UserDomain A | 4-17-2007 16:07:41 | Clicked Heading (search for) | Displays: Liquid Crystal (LCD) | | NA | 00:16 |
| User A | UserDomain A | 4-17-2007 16:07:57 | Clicked Result at position (pos) | Displays: Liquid Crystal (LCD) | 1 | NA | 01:40 |
| User A | UserDomain A | 4-17-2007 16:09:37 | Clicked Result at position (pos) | Displays: Liquid Crystal (LCD) | 2 | NA | 00:34 |
| User A | UserDomain A | 4-17-2007 16:10:11 | Clicked Result at position (pos) | Displays: Liquid Crystal (LCD) | 3 | NA | 01:25 |
| User A | UserDomain A | 4-17-2007 16:11:36 | Clicked Result at position (pos) | Displays: Liquid Crystal (LCD) | 4 | NA | 07:24 |
| User A | UserDomain A | 4-17-2007 16:19:00 | Clicked Result at position (pos) | Displays: Liquid Crystal (LCD) | 5 | NA | 00:31 |
| User A | UserDomain A | 4-17-2007 16:19:31 | Clicked Result at position (pos) | Displays: Liquid Crystal (LCD) | 5 | NA | 02:04 |
| User A | UserDomain A | 4-17-2007 16:21:35 | Clicked Result at position (pos) | Displays: Liquid Crystal (LCD) | 6 | NA | 00:25 |
| User A | UserDomain A | 4-17-2007 16:22:00 | Clicked Result at position (pos) | Displays: Liquid Crystal (LCD) | 7 | NA | 00:26 |
| User A | UserDomain A | 4-17-2007 16:22:26 | Clicked Result at position (pos) | Displays: Liquid Crystal (LCD) | 8 | NA | 00:33 |
| User A | UserDomain A | 4-17-2007 16:22:59 | Clicked Result at position (pos) | Displays: Liquid Crystal (LCD) | 9 | NA | 00:57 |
| User A | UserDomain A | 4-17-2007 16:23:56 | Clicked Result at position (pos) | Displays: Liquid Crystal (LCD) | 11 | NA | 01:18 |
| User A | UserDomain A | 4-17-2007 16:25:14 | Exit | Displays: Liquid Crystal (LCD) | 13 | NA | 00:00 |

FIG. 2

| Activity Rank | Duration Rank | Company | URL | Average Duration | Exit % |
|---|---|---|---|---|---|
| 1 | 13 | Company 1 | http://www.company1.com | 01:40 | 15.8 % |
| 1 | 10 | Company 2 | http://www.company2.com | 01:45 | 37.5 % |
| 2 | 24 | Company 3 | http://www.company3.com | 00:58 | 11.3 % |
| 3 | 2 | Company 4 | http://www.company4.com | 02:08 | 51.0 % |
| 3 | 5 | Company 5 | http://www.company5.com | 01:58 | 20.8 % |
| 4 | 9 | Company 6 | http://www.company6.com | 01:48 | 14.8 % |
| 5 | 22 | Company 4 | http://www.company4.new.com | 01:18 | 33.3 % |
| 6 | 15 | Company 7 | http://www.company7.com | 01:33 | 9.1 % |
| 7 | 7 | Company 8 | http://www.company8.com | 01:52 | 17.9 % |
| 8 | 16 | Company 9 | http://www.company9.com | 01:25 | 17.0 % |
| 8 | 11 | Company 10 | http://www.company10.com | 01:42 | 17.9 % |
| 8 | 18 | Company 11 | http://www.company11.com | 01:23 | 12.8 % |
| 9 | 3 | Company 12 | http://www.company12.com | 02:07 | 35.2 % |
| 9 | 1 | Company 13 | http://www.company13.com | 02:20 | 28.9 % |
| 10 | 17 | Company 12 | http://www.company12.new.com | 01:25 | 9.1 % |
| 11 | 8 | Company 14 | http://www.company14.com | 01:50 | 12.5 % |
| 12 | 26 | Company 15 | http://www.company15.com | 00:52 | 6.9 % |
| 13 | 25 | Company 16 | http://www.company16.com | 00:54 | 10.0 % |
| 14 | 23 | Company 17 | http://www.company17.com | 01:16 | 10.3 % |
| 15 | 14 | Company 18 | http://www.company18.com | 01:35 | 12.9 % |
| 16 | 20 | Company 19 | http://www.company19.com | 01:21 | 13.3 % |
| 17 | 19 | Company 20 | http://www.company20.com | 01:21 | 30.8 % |
| 17 | 6 | Company 21 | http://www.company21.com | 01:56 | 14.8 % |
| 17 | 21 | Company 22 | http://www.company22.com | 01:20 | 9.1 % |
| 17 | 4 | Company 13 | http://www.company13A.new.com | 02:05 | 20.8 % |
| 18 | 27 | Company 23 | http://www.company23.com | 00:34 | 12.5 % |
| 18 | 12 | Company 24 | http://www.company24.com | 01:41 | 4.2 % |

FIG. 3

MARKETING METHOD AND SYSTEM USING DOMAIN KNOWLEDGE

This application is based on, and claims priority to, U.S. provisional application having Ser. No. 60/824,499, having a filing date of Sep. 5, 2006, entitled Marketing Method and System Using Domain Knowledge.

FIELD OF THE INVENTION

The invention relates generally to competitive intelligence, and in particular to competitive intelligence that can be derived from user behavior with respect to Internet advertising.

BACKGROUND OF THE INVENTION

Market focused directories, such as ThomasNet® and Sweets Network® are popular advertising venues for manufacturers and service providers. Advertisers listed in these directories may receive general information about user activity on their sites, for example, how often the sites are accessed, but such information is not always of much value because it does not tell the advertiser enough about the actual users. The market focused directory companies can describe the users as a high-quality, focused audience, but before now there has been little concrete data to back up the claims. Accordingly, a method to compile data on particular users and correlate it with user activity would be beneficial to the directory companies and the advertisers listed in their directories.

The concept of implicit measures, such as durations has been used to evaluate Internet advertising. Previously durations have been used by accumulating data from general searches on the Internet. The quality of such data can be poor because the users whose activity is being evaluated or measured may not be a high quality, focused group. Poor quality of the user being evaluated translates to poor quality advertising analysis. Accordingly a better pool of users needs to be tapped to improve the quality of the resulting Internet advertising evaluation.

SUMMARY OF THE INVENTION

Methods of evaluating advertising are disclosed based on analysis of user behavior in a market focused directory that contains a taxonomy. Users' actions are logged over a specified time period. Implicit measures are derived from the log files and read into one or more databases. The implicit measures are aggregated across a plurality of user sessions; and a report of the user behavior with respect to a single URL or a comparison between URLs is created.

Implicit measures can be aggregated for a number of URLs have a common characteristic, such as ownership. The URLs can then be compared to one another, or to other implicit measure of other groups of URLs.

In a further embodiment of the invention the user's Internet Protocol address is obtained. The Internet Protocol address is cross-referencing against a database to obtain geolocation information with respect to the user. This information can be combined with implicit measure information to analyze Internet advertising on a market focused directory.

In an exemplary embodiment of the invention, the implicit measures are durations. In a further embodiment they are exit percentages. A combination of implicit measures may also be used to evaluate Internet advertising.

In another embodiment of the invention, legacy implicit measures from earlier time periods are compared to reports of more recent time periods.

In yet another embodiment of the invention, implicit measures are combined with financial information to derive a return on investment related to Internet advertising on a market focused directory.

Further embodiments of the invention include a machine readable storage medium containing an executable code configured to perform methods of the invention and a system for use in carrying out methods of the invention.

DESCRIPTION OF THE DRAWINGS

The invention is best understood from the following detailed description when read with the accompanying drawings.

FIG. 2 is a table prepared according to embodiments of the invention illustrating a pattern of user behavior on an MFD.

FIG. 3 is a table showing a comparison of average duration and exit percentage for advertisers in an MFD heading prepared according to an illustrative embodiment of the invention.

DETAILED DESCRIPTION OF THE INVENTION

Figure 1:
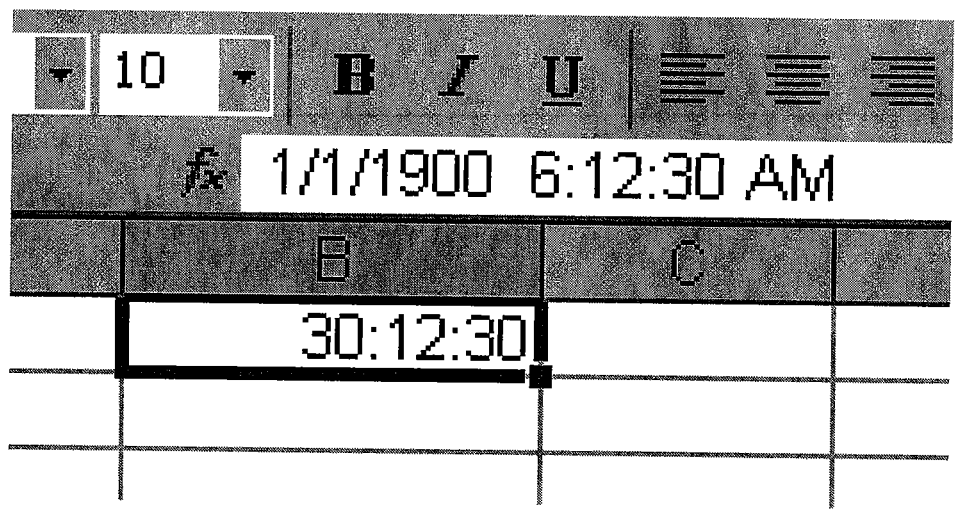
FIG. 1 depicts a screen shot to support a discussion of the concept of durations.

The following definitions will aid in the understanding of the invention.

Duration: the time between clicks in a user session on the Internet

Exit Percentage: the count of all end actions divided by the count of total actions Explicit Measures: measures obtained directly from a web user. For example, a user rating or review, etc.

Geolocation Company: A vendor that maintains and updates a database that contains mappings from an IP address to its corresponding geography (city, state, country, zip, area code) and data associated with the owner of the IP address (owner's organization name, the associated domain, etc.)

Geolocation Information—Information, such as country, state, city, zip code, location (latitude/longitude) of the user, that can be obtained by resolving a user's IP address to a Domain or ISP, i.e. performing a "Reverse DNS lookup" or "Reverse IP lookup"

Implicit Measures: measures that can be derived or calculated without soliciting direct feedback from a use—examples: average duration of all visits to a website, and exit percentage Market Focused Directory (MFD)—directory that incorporates a taxonomy that defines product or service categories for a specific market—Product headings in an MFD can be considered a taxonomy that defines products and service categories for a particular market. These market categories can be classified in a number of ways, such as by Standard Industrial Classification codes (SIC), North American Industrial Classification System (NAICS), United Nations Standard Products and Services Code (UNSPSC) or other industry grouping.

Search Engine—a searchable online database of internet resources

Taxonomy—a set of controlled vocabulary terms, usually hierarchical. Taxonomies are used for navigation, search and classification.

Web Directory—a listing of categories and associated content compiled by individuals rather than algorithmically by using spiders and robots.

The invention relates to use of implicit measures derived from user behavior when accessing and using an MFD, to evaluate Internet advertising. It has been found that duration, click-through, end action and other implicit measures are strong predictors of user satisfaction.

Use of implicit measures to evaluate Internet advertising has a number of potential advantages.

1. Implicit measures can be obtained algorithmically which makes them inexpensive.
2. Implicit measures do not alter the behavior of the users they are collected from.
3. Potentially, every user interaction with an MFD can contribute to an implicit rating.
4. Implicit measures can be obtained in quantity due to the large data sets available (MFD web log data for example). Cheaper and faster computing and storage has made the mining of these datasets much more feasible in the past few years.

The concept of a market focused directory (MFD) is portable across markets. Examples of MFDs include McGraw Hill's Sweets Network, where the market is "North American Architectural, Engineering and Construction" and the taxonomies used are the Construction Specification Institute's (CSI) Masterformat®, and a proprietary product taxonomy as defined by Sweets, and ThomasNet®, which addresses the North American industrial market and has an associated product taxonomy (product headings) correlating to the industries it serves.

Market Focused Directories help their audience perform specific work tasks. For example, ThomasNet® aids engineers and purchasing professionals in the industrial market with sourcing and purchasing tasks. ThomasNet® provides search results tailored to support these tasks. ThomasNet's taxonomy facilitates location of a product and provides relevant information for sourcing and purchasing a product.

Use of a Market Focused Directory-based advertising analysis in many ways is a significant improvement over other known advertising evaluation methods. The implicit measures captured are the interactions of a high quality audience with a product taxonomy and the websites of the manufacturers of these products. The aggregation, analysis and comparison of these measures by category and manufacturer provide a source of competitive intelligence for manufacturers. This is a much more focused analysis than that which can be performed by evaluating links generated from key word searches using conventional search engines, such as Google® and Yahoo®.

Analyzing user behavior on an MFD using implicit measures, and more particularly combining it with user geolocation information, has several advantages:

Using a taxonomy has the effect of "controlling for query", or reducing the variability of search terms used to find a product. This makes the comparison of implicit measures in the product categories a true product-to-product comparison.

Geolocation information, obtainable when a user accesses an MFD, allows an MFD to aggregate "market level" information about its audience (e.g. what companies/industries do they belong to, where are they located geographically).

Over time, the data can be analyzed for user trends at the market, category and company levels.

Geolocation information has become very important to any entity compiling data on individuals and their actions, such as information providers like ThomasNet®. Users are now requiring anonymity while browsing the Web, and they are much less inclined to register for any service that will personally identify them to a company or individual.

Geolocation information helps bridge this gap for information providers. It allows the provider to generally identify a user by their geolocation information, and it allows users of the service to remain virtually anonymous. Combining geolocation information with implicit measures can generate important competitive intelligence information.

Illustrative Examples of Geolocation Uses:

Banking—Online banks use IP Resolution to verify users and to black list regions.

Ecommerce—Fraud checking and forensic investigations.

Advertising—advertising can be bought based on the location of the user. Commonly called "GeoTargeting."

Media Distribution—Online video/television streams can be blacked out for certain regions (Major League Baseball—mlb.com).

Dynamic Content—Web sites use the geography resolution to target geographies with specific content.

Generally, there are two different methods that a person can use to obtain geolocation information about users that appear in their web logs. What follows is a brief description of illustrative embodiments of these exemplary methods. Additional methods may exist or be developed in the future, and to the extent they can be utilized are within the spirit and scope of the invention.

In the first case, geolocation information can be collected at the Web server level, meaning that as requests come into a web server, a program or lookup of the users' IP address is executed, and the resulting geolocation information is written to the Web log file or other file. For purposes of this discussion this method of obtaining geolocation info will be called PRE, short for PRE processed.

The second case entails using an external method, such as a program, or database table, to lookup geolocation information for IP addresses in a web log or other file. For purposes of this discussion this method will be called POST, short for post processed.

The PRE method is not used very often because of the additional overhead that the lookup places on the web server. The point is that geolocation information can be a default part of a web log if the server is configured properly. This true on Microsoft® Internet Information Services (IIS), and likely for other Web server programs (Apache etc.).

In an illustrative embodiment of the invention, a POST method is used to obtain geolocation info for log reports. Web logs are post-processed to add additional information from a reverse IP info database table. The reverse IP information is obtained from geolocation vendors, such as from IP2Location®.

There are multiple vendors that provide reporting on geolocation information (domain, country etc.). Some of these packages are listed below with a designation of whether they use a PRE or POST method to obtain this data in their packages (as far as can be readily determined).

Flash Stats™ (PRE METHOD)
AWStats™ (POST METHOD via Maxmind databases)
Webtrends® (POST METHOD via. GeoTrends add-in)

By using session analysis and geolocation information, the quality of a website visitor can be demonstrated.

Following is an example of an illustrative embodiment of the invention, wherein ThomasNet® is used as an illustrative MFD.

ThomasNet®, a comprehensive web-based resource for industrial information, products, services, etc. will be used as the illustrative website for purposes of this example. Users are no longer supplying personally identifiable information via registration processes on the Internet, such as when registering with ThomasNet®. To bridge that gap, a session report is created.

In a session report, the ThomasNet® user is identified coming from an IP address that resolves to the Boeing Company in Seattle, Wash. It can be shown for example, that the user browses the ThomasNet® website searching for Aircraft Bearings.

Furthermore, we can classify users by the industry they work in. In the above case we can classify the user's industry as "Aerospace/Defense—Major Diversified"

The fact that the user can be resolved to Boeing in Seattle is an example of GEOLOCATION, and it is one of the items that are added to reports of the invention to make them more valuable.

Continuing with the example, it can then be shown that the user investigates a series of ThomasNet's® advertiser's websites relevant to Aircraft Bearings by clicking on their web links in ThomasNet® spending time in their Web sites.

When the user is finished checking an advertiser's site, they will often come back into ThomasNet® to look at the next advertiser in Aircraft bearings etc.

When you look at the session in total, it is relatively easy to determine that the user is trying to source aircraft bearings and is using ThomasNet as a directory to find a company that can supply them. Therefore, this session report shows that this is a valuable user to an advertiser. The user is considered valuable because the user was searching for the term "Aircraft bearings", and also the user actually investigated the advertiser's website and the websites of several of its competitors.

These session reports can be valuable to the advertiser and can be successfully used by an MFD sales force to recruit new advertisers or sell additional services to existing advertisers. An actual session report can be much more convincing than a mere count of links to a website.

In another embodiment of the invention, we all user sessions are aggregated to an advertiser in a category by the industry that the user originates from. This shows the advertiser the industry mix that is accessing their content.

Duration is an implicit measure that can be used to evaluate relevance and quality of website advertising. Following is an illustrative example of "durations" and aggregation functions.

Database systems are very good at the storage, retrieval and manipulation of data. In order to make a database work correctly, data needs to be organized into tables, and furthermore tables need to be organized into fields.

Fields are the lowest level of data organization in a database and they must conform to the data types that are available in the database system.

A data type is a set of data with values having predefined characteristics. Some examples of data types are: integers, floating point numbers, character strings, xml strings, dates, times etc.

A problem occurs when you want to store a new type of data in a database system. In the present example, the time between clicks on a website is what is called a "duration".

Durations are difficult to represent in a database system because they do not fit any of the pre-defined data types in a database system. A duration is essentially a time span, or a count of the hours, minutes and seconds between two actions.

If you try to store a duration in a typical database system, you must use one of the built-in database types that the system provides. For example, when using a structured query language (SQL) server you generally would have two options for storing this temporal data, DATE TIME and SMALL DATE TIME, which are built in data types, but here is where the problem occurs.

FIG. 1 represents a Microsoft Excel® session wherein a duration of 30 hours, 12 minutes and 30 seconds is typed into a cell according to an illustrative embodiment of the invention. The command line shows that the duration has been automatically changed into a DATETIME value of 1/1/1900 6:12:30 AM. This is because Microsoft Excel® does not have a type available to represent a duration. It takes the data and converts it to a data type of "datetime". This is also what happens when you use the built in data types in the SQL server.

Following is an illustrative solution to the problem. When the SQL server 2005 was released, it provided the ability for users to create their own data types by using user-defined types (UDT's). Using this technology a new UDT called "Duration" is created.

In Microsoft® Visual Basic® .NET (which is an illustrative language that can be used to create the UDT), there is a programming object called a TimeSpan. A TimeSpan object represents a time interval, or duration of time, measured as a positive or negative number of days, hours, minutes, seconds and fractions of a second. It is noted that other tools designed for creating .NET applications may be used.

This type of object represents the durations in the database. The functionality of the TimeSpan object can be encapsulated and brought to SQL server as a new data type.

The UDT for durations can then be used like the native data types built into the SQL server (i.e. integers, datetime etc.).

The database can now store, retrieve, index, update data types of type duration.

Now that the data type of Duration is built into the database system, a way to create aggregations of this data type is needed. Aggregations are functions such as Sum, Average, Standard Deviation, etc. . . . that can be performed on fields in a database.

The SQL server can now store, update, and delete a duration, but it cannot average a group of durations, or sum a group of durations etc.

Again it is necessary to write functions that give the SQL server the ability to perform these actions. In an exemplary embodiment of the invention, the aggregation function AvgDuration is created, and again this functionality is imported into the SQL server.

Now when the following command in the SQL server (in pseudo code) is issued:

Select the AvgDuration of all durations where a user clicked on a weblink after searching for "gears."

The database system can now process this query. The duration type has been defined, and the functions needed to calculate the average of all of the durations that meet the criteria are available to the database system.

In an illustrative embodiment of the invention, durations are obtained by processing MFD web log files and reading the results into a database. Presently, durations cannot be obtained directly from web logs due to the stateless nature of an http request. For example, if you look at an unprocessed web log, you will see the time stamped records of the requests and responses of the http server. Once a request is completed by the web server, it is discarded. Durations require knowledge of these prior requests in order to calculate the time elapsed between the requests. Therefore, the raw web logs are reprocessed, adding the implicit measure "duration" to the data.

Once the durations are processed, they can be utilized as implicit measures of user behavior. This is illustrated below with a simplified example of a typical user session with durations added as shown in the table in FIG. 2. The FIG. 2 table illustrates a typical pattern of user behavior on an MFD.

In this session, User A from UserDomain A does an initial product search for "lcd" (first row), then 7 seconds later (duration column) the user clicks on the product category "Displays: Liquid Crystal (LCD)" (second row).

At this point, the user has the MFD list of LCD manufacturers displayed in their browser. The remaining clicks in this session are visits to websites of 11 different MFD advertisers in the heading.

The last line is the last recorded action of the user on MFD. The user exited the MFD after navigating to the URL of the 13th ranked advertiser in the product category. The duration of this action cannot be calculated since there is no further communication with the web server.

The durations of each visit varies from a high of 7:24(min:sec) for the #4 ranked advertiser, to a low of 00:25 for the #6 ranked advertiser. The rank is read from the (pos) column of the table.

When these durations are aggregated across a plurality of user sessions, the implicit measure of average duration can be calculated.

When durations are averaged across all advertisers in an MFD category, the comparison of the resulting values provide valuable competitive intelligence.

Following is an illustrative example of a report for advertisers listed on an MFD in the category Displays: Liquid Crystal (LCD). It covers all weblink conversions in the heading for the period of August 2006 through April 2007. This report is depicted in FIG. 3, which shows a comparison of average duration and exit percentage for advertisers in an MFD heading.

The average duration for all visits to this category was 1:32(m:ss)+/−5.0 seconds (95% confidence level). This can be used as a point of comparison for all advertisers.

Other types of durations, ratios and comparisons are within the spirit and scope of the invention. For example:

(1) ratio of a given URL selection duration relative to an average URL duration for a particular user
(2) ratio of a given URL selection duration relative to all selections;
(3) duration from a URL selection from one search query to a subsequent search query made by the same user.
(4) ratio of duration from a URL selection from one search query to a subsequent search query made by the same user, to duration from a URL selection from one search query to a subsequent search query made by all users.

FIG. 2 has a column with the heading "cov" which designates "coverage area." In an illustrative example, the user can choose between a regional or national search. The user's choice would be indicated in the "cov" column. Certain businesses distribute their products locally, for example, metal fabrication and plastic injection molding businesses. Advertisers can purchase position in regions or nationally in the MFD based on where their market is. Accordingly, the coverage area can be of interest to advertisers.

The average exit percentage is another parameter that can be useful in evaluating Internet advertising. FIG. 3 is a table showing exit percentages for a number of URLs listing in a given MFD heading. Exit percentage is the count of all links where the user left the MFD (i.e. last row, FIG. 3) divided by the number of all links.

The columns defined in the report shown in FIG. 3 are as follows:

1. Activity Rank: the comparison of the total number of clicks received by the advertisers in the heading. The advertiser with the higher activity rank received more clicks that the #2 in activity rank and so on. In case of ties, the advertisers receive the same rank.
2. Duration Rank: the comparison of the average duration of all links to the advertiser at the URL specified in the URL column. Since this analysis covers a large time frame (8/06 through 4/07) there are cases where the advertiser's URL has changed. In these cases, the average duration is calculated separately for each URL, i.e. for Company 4, Company 12, and Company 13.
3. Company: entity name
4. URL: the URL that the advertiser has or had at the category, Displays: Liquid Crystal (LCD's), for the period 8/06 through 4/07.
5. Average Duration: the time between clicks in a user session on an MFD. Average duration is the aggregate average of these measures for a particular advertiser.
6. Exit %: the percentage of clicks where a user visits a URL and does not return to the MFD.

The exit percentage can be interpreted in two ways:
1. The user exited because they found what they were looking for at the advertiser's link; therefore a higher average is desirable.
2. The user exited after multiple links, abandoning the search at the advertiser's link; therefore a lower average would be desirable.

For this category the average exit percentage was 26.3%+/−3.95% (95% confidence level). An interesting relationship between exit percentage and average duration is demonstrated in the report and supports interpretation number 1 above.

Another comparison of interest on the report is the relationship of each advertiser's average duration to the average for the category as a whole. For example, take a look at the first duration for Company 4. The report shows an average duration for the URL (http://www.company 4.com) of 2:08 (m:ss). This average is significantly greater than the heading average of 1:32. This average duration can be used as an implicit measure of relevance; therefore, it can be concluded that this URL is more relevant than the average URL in the heading.

Comparisons can be performed for all advertisers, giving them insight into the performance of their web content with the MFD user base. Through the use of geolocation information, it can be determined that the users are high quality; therefore average durations can show how the advertiser's content performs with a highly desirable audience.

The report can be repeated for all categories, giving an advertiser a comprehensive view of every heading they advertise in. This can help an advertiser pinpoint sections of their website where their content is or is not working. These reports can also help a sales force isolate prospects for a particular MFD.

Another interesting comparison can be seen where an advertiser has two URLs listed on the report. Again, look at Company 4. Company 4 has had two different URL's for the time period of 8/06 through 4/07. The first URL (http://www.company4.com) has an average duration of 2:08, and the second URL (http://www.compnay4.new.com) has an average duration of 1:18. The second URL is the current URL today. This report can show Company 4 that its current content is underperforming what they had there previously. This report will alert them to the difference, and allow them to make appropriate changes.

The preceding paragraph described a comparison between implicit measures related to two URLs owned by the same company. These URLs had the common characteristic of ownership. Other common characteristics can be used to group and compare URLs. For example, market segment; geographic location; entity size; languages; website characteristics such as webpage format and existence of intros.

Implicit measures can be used to create reports at various levels. One such level is the category level. A category report is a summary report for a specific search term from the taxonomy associated with the MFD being used, or synonyms for words or phrases in the taxonomy. Other illustrative report levels include, market level, company level.

Turning again to the ThomasNet® example, some illustrative questions that a category report can answer are as follows:

"what is the average time that a user spends on my web site while looking for Aircraft Bearings?"
"What is the average time a ThomasNet® user will spend on a website when looking for Aircraft Bearings?"
"Why are people spending more time on my competitor's website when looking for Aircraft Bearings?"
"Is the content on my site useful to people looking to buy Aircraft Bearings?"

The last two questions can be answered by a category report generated by comparing the answers to the first two questions above.

If the advertiser's website is underperforming the average for a specific search term, it most likely means that the content of the advertiser's site is not relevant to the user's search.

The category report can point this out in a concise easy-to-understand format.

The category report can be used as competitive intelligence for an advertiser. It shows the advertiser how they compare with their competition in a particular category, and gets them thinking about what they can do to improve their sites in order to keep pace/catch/overtake the competition. The additional information provided in the reports can be used in a variety of ways, any of which are within the spirit and scope of the invention.

Additional data elements, such as the company identification and product/service category classification information links, can be added to the database for implicit measure analysis and reporting, which serves to broaden the scope of the duration analysis. This will allow the ability to tie the activity data back into editorial data, such as manufacturer/distributor indicator, number of employees, corporate family members, branches, geographic locations, etc., and into financial data, such as annual sales, client account data, duration as a customer, specific products purchased, etc. This should facilitate answering questions about an advertiser's account, such as:

Are they in the right categories?
Are they missing categories that they should be in?

A return on investment (ROI) calculation can be calculated for an advertiser's investment obtained from the data.

The additional data elements can be added to the database via an account management system and account ID numbers, wherein the ID numbers are the reference numbers used to attach editorial and/or financial information.

An example of these additional data elements, such as total advertising dollars spent in a category, can be used to calculate ROI for the advertiser in that category.

By aggregating all categories an advertiser purchases positions in, and examining the dollars that they spend in each, we can derive a very detailed ROI calculation. This can show the advertiser which categories are most profitable, and can help them determine the optimum allocation of their advertising dollars.

In an illustrative embodiment of the invention, the additional data is obtained from log files from other sources and incorporated into the database. Existing databases can often be utilized for this purpose, such as various sources of product and business news and information. Illustrative examples of data sources include Product News Network® and Dun & Bradstreet®.

Another embodiment of the invention is a superset of the version described in the preceding paragraph. Legacy data going back to a desired time is incorporated. This database can have the implicit measures pre-computed. This will facilitate, for example, creation of unique trend reports. Legacy implicit measures can be compared to present implicit measures or to one or more legacy implicit measures. In yet another embodiment of the invention, the legacy data is used to go back and approach former advertisers with some reports.

Illustrative methods of the invention are shown in the flow charts depicted in FIGS. 4-9.

Figure 4:
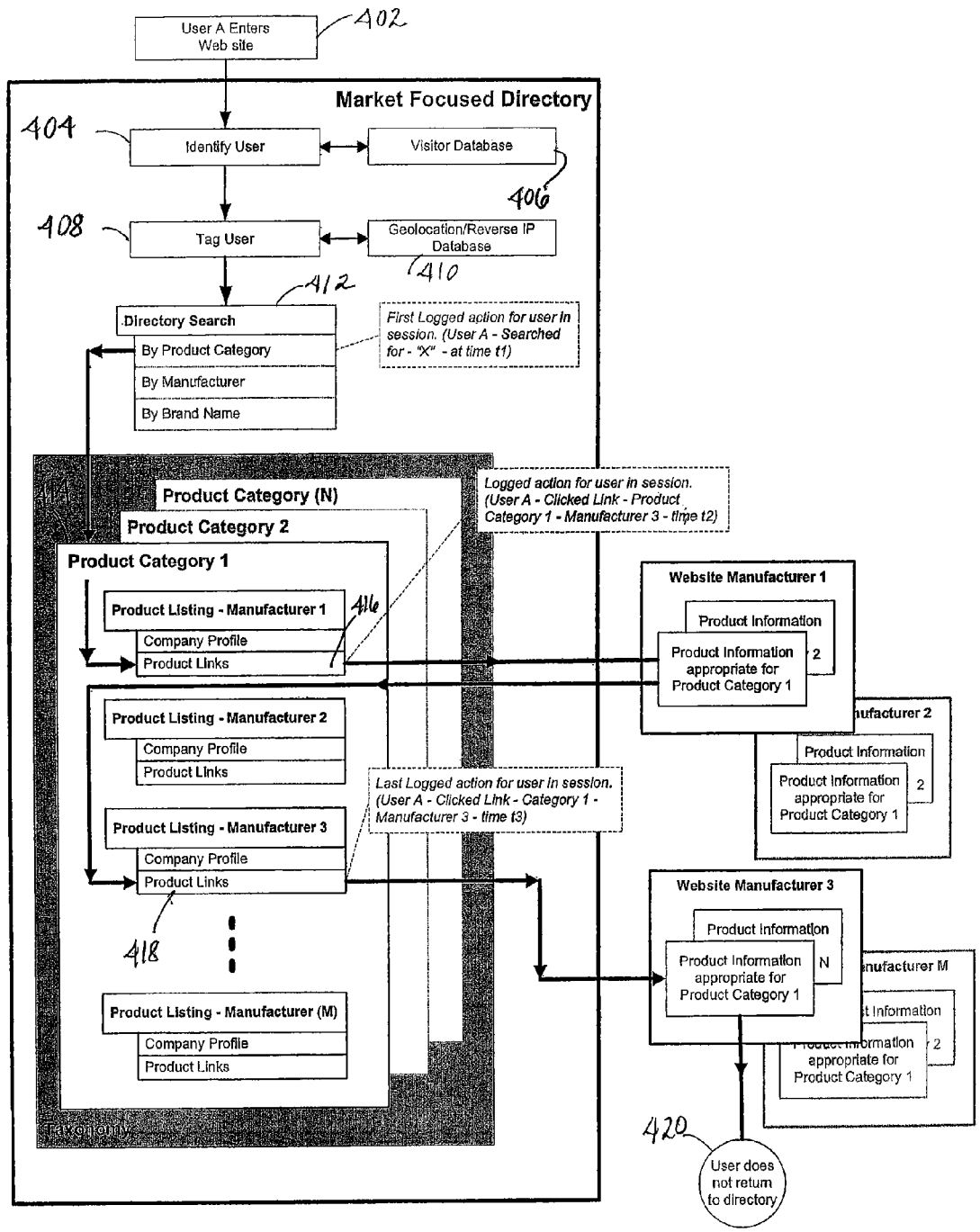
FIG. 4 depicts user interaction with an MFD according to an illustrative embodiment of the invention.

FIG. 4 depicts user interaction with an MFD 400 according to an illustrative embodiment of the invention. User A enters the MFD website at block 402. The user is identified in step 404. Visitor database 406 is checked and if the user is not listed in the database, the user identification information is added to database 406. In step 408, the user is tagged to obtain geolocation information via a reverse IP database 410. The user then begins a search in step 412 by accessing available lists of products or services. In this illustrative embodiment of the invention, the directory provides list according to product category, manufacturer and brand name. This is the first logged action for the user in the session and is recorded as starting at time $t_1$.

In this illustration, the user has selected a search by category and has accessed Product Category 1 in step 414. A listing of manufacturers providing products in Category 1 is displayed to the user. The user links to Manufacturer 1's website in step 416 at time $t_2$. The user views product information on the website, then moves to the link for Manufacturer 3 in step 418 at time $t_3$. Manufacturer 3's product information is then displayed to the user. In this particular embodiment the user has chosen not to view Manufacturer 2's website, at least not in listing order. Eventually the user chooses not to return to the directory in step 420. The user could also choose to select a new product to search or select a different search category, such as by manufacturer or brand name.

Figure 5:
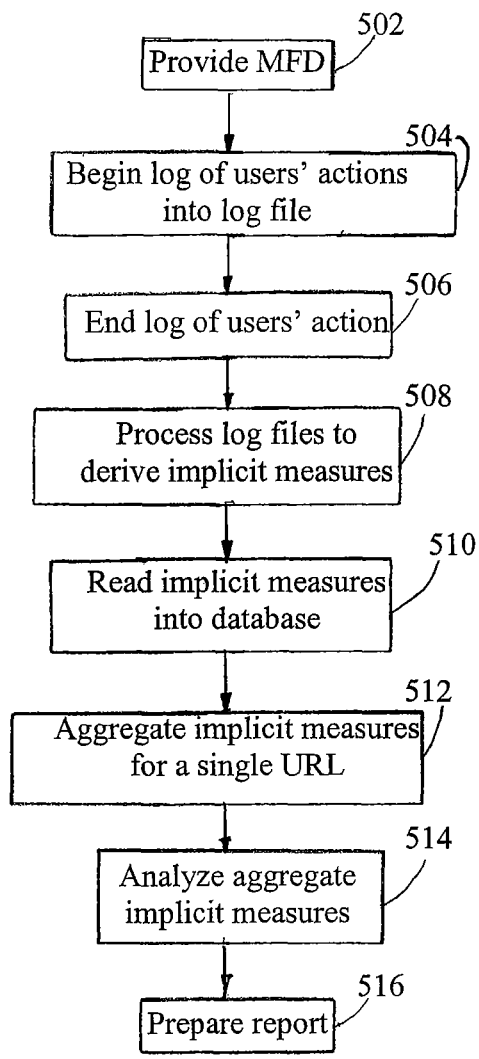
FIG. 5 is a flow chart of a method of evaluating advertising according to an illustrative embodiment of the invention.

FIG. 5 is a flow chart of a method of evaluating advertising according to an illustrative embodiment of the invention. In step 502 an MFD having a plurality of URLs categorized under a plurality of categories is provided. One or more users' actions in using the MFD are logged over a specified time period, into one or more log files in steps 504 and 506. In step 508 the log files are processed to derive implicit measures from the users' actions. These implicit measures are then read into one or more databases in step 510. In step 512 the implicit measures regarding a single URL are aggregated across a plurality of user sessions. The aggregated implicit measures are then analyzed in step 514 to determine user behavior related to use of the URL. A report of the implicit measures is created in step 516. Alternatively, implicit measure data can be entered into a report and an analysis performed on the presented data.

Figure 6:
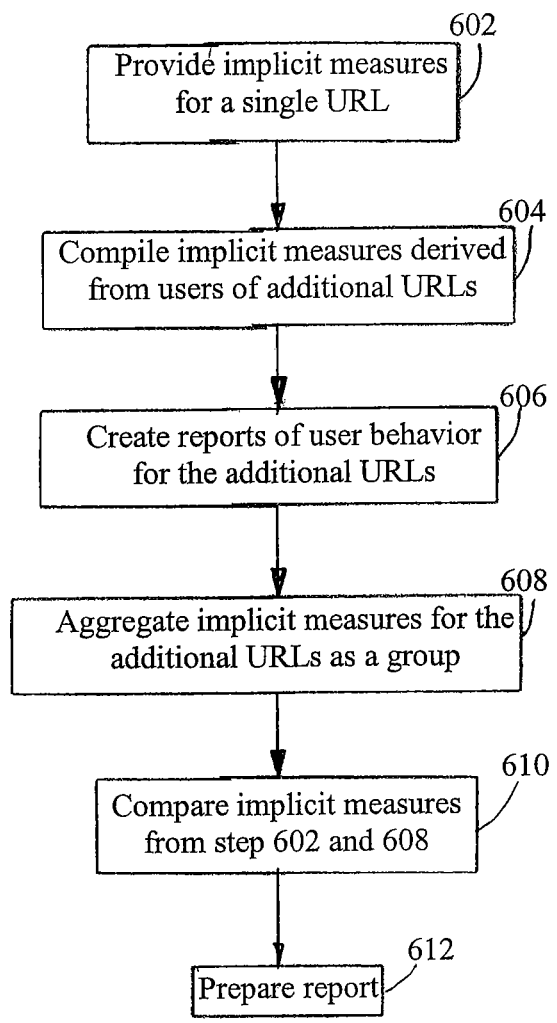
FIG. 6 is a flow chart of a method according to an illustrative embodiment of the invention that is an extension of the method outlined in FIG. 5.

FIG. 6 is a flow chart of a method according to an illustrative embodiment of the invention that is an extension of the method outlined in FIG. 5. In FIG. 5 the method resulted in a report of implicit measures for a one or more users accessing a single URL. This information is provided in box 602. In step 604 implicit measures derived from users of additional URLs is compiled and processed by the method of FIG. 5 or a comparable method. In step 606 one or more reports are created on the user behavior associated with the additional URLs. In step 608 the implicit measures for the group of URLs are aggregated. Implicit measures for individual URLs can then be compared to the implicit measures for the group of URLs in step 610 and a report prepared in step 612. The group may represent a particular MFD heading, a subset of the MFD, such companies of a particular size or in a particular location.

Figure 7:
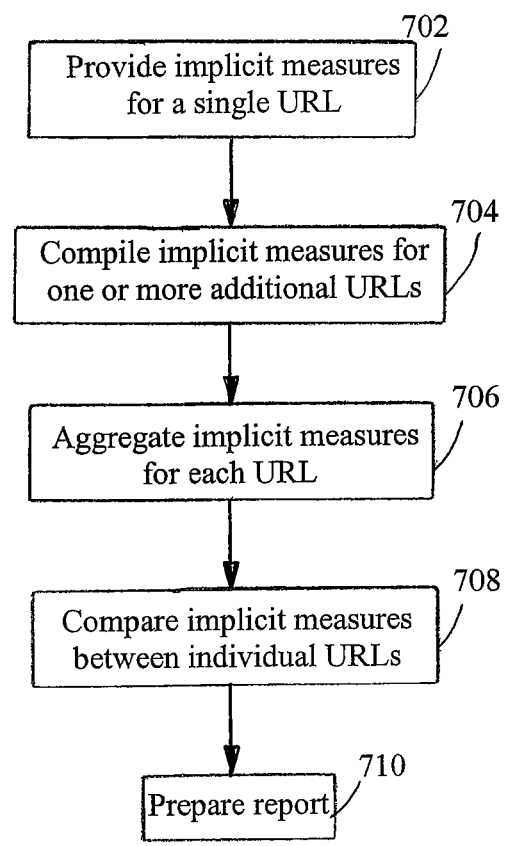
FIG. 7 is a flow chart of further method according to an illustrative embodiment of the invention wherein implicit measures for individual URLs are compared to implicit measures for other individual URLs.

FIG. 7 is a flow chart of further method according to an illustrative embodiment of the invention. This case is similar to that which is depicted in FIG. 6, however, in this embodiment, implicit measures for individual URLs are compared to implicit measures for other individual URLs, rather than being compared to implicit measures for an entire group. In steps 702 and 704 implicit measures for single URLs are compiled. In step 706, the implicit measures are aggregated. Implicit measures of individual URLs are then compared in step 708. Reports can then be created in step 710.

Figure 8:
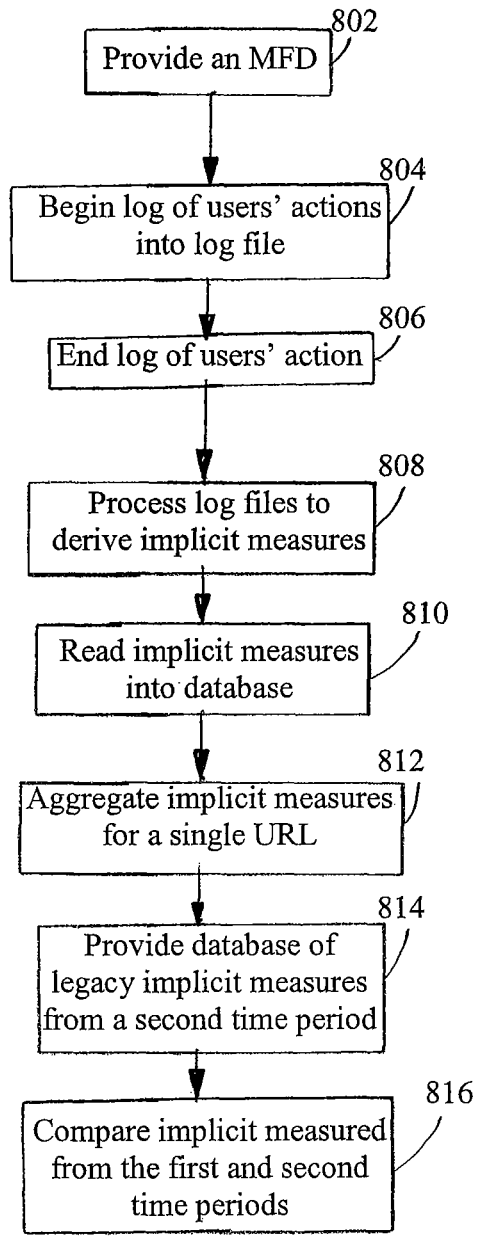
FIG. 8 depicts a flow chart of a method involving legacy databases of implicit measures according to an illustrative embodiment of the invention.

FIG. 8 depicts a flow chart of a method involving legacy databases of implicit measures according to an illustrative embodiment of the invention. In step 802 an MFD having a plurality of URLs categorized under a plurality of headings is provided. One or more users' actions in using the MFD are logged over a first time period, into one or more log files in steps 804 and B06. In step 808 the log files are processed to derive implicit measures from the users' actions. These implicit measures are then read into one or more databases in step 810. In step 812 the implicit measures regarding a single URL are aggregated across a plurality of user sessions. In block 814 a database of legacy implicit measure from a second time period, earlier than the first time period is provided. In step 816, the implicit measures from the first time period are compared to the implicit measures of the second time period.

Figure 9:
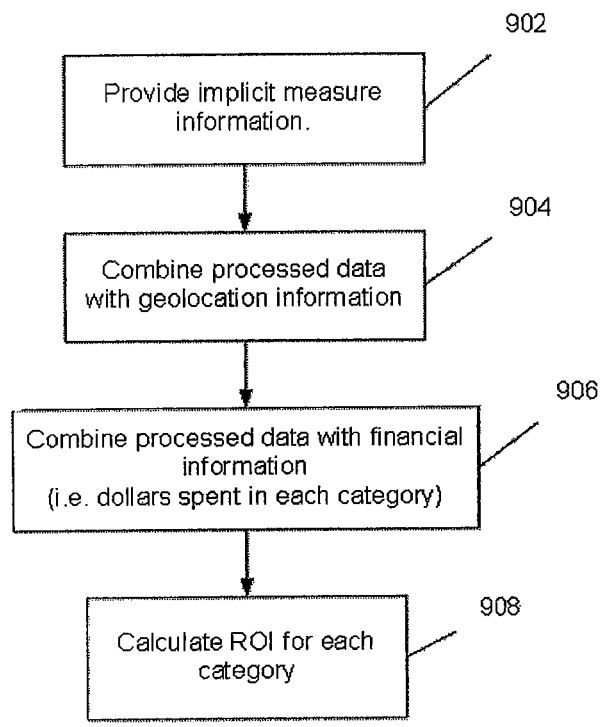
FIG. 9 depicts a flow chart of a method involving use of financial information and implicit measures to calculate the return on investment related to Internet advertising.

FIG. 9 depicts a flow chart of a method involving use of financial information and implicit measures to calculate the return on investment related to advertising on the Internet. Implicit measure information, such as is derived from the method depicted in FIG. 5, is provided in block 902. Geolocation information is appended to the log files in block 904. In step 906 the financial information, such as the dollars spent in a product categories, is appended and aligned with the calculated implicit measures for the categories. In step 908 return on investment is calculated based on the financial information and implicit measures.

The invention also includes a machine readable storage medium containing an executable code configured to perform one or more of the methods described herein. The invention further includes a system having one or more processors, a memory coupled to the processor and a machine-readable medium having machine-readable program code therein for directing operation of the system. The machine-readable program code is configured to cause the computer to carry out one or more of the methods described herein. The system may further include an output device functionally connected to the processor to produce the reports or other material.

Figure 10:
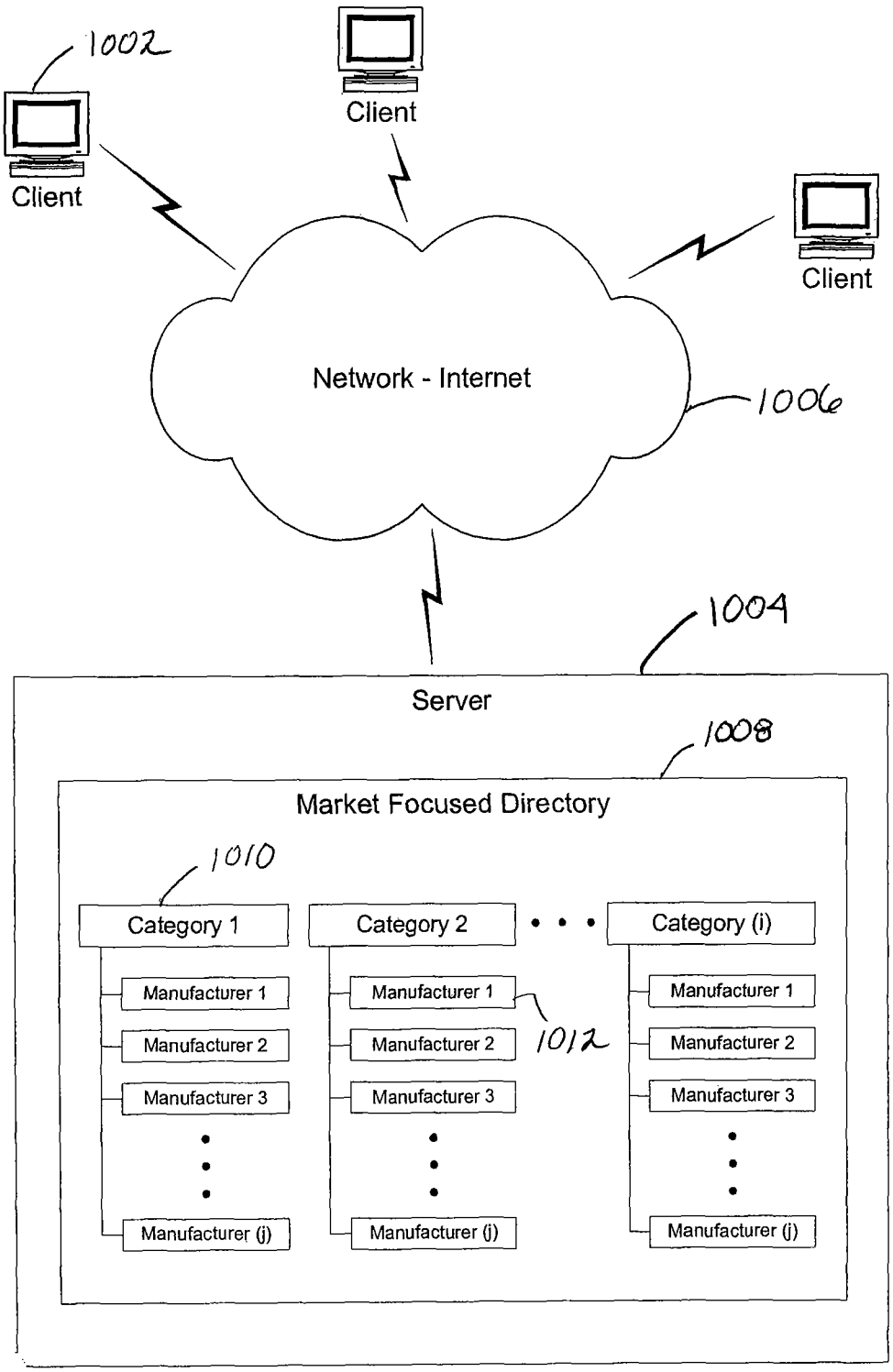
FIG. 10 depicts a network configuration according to an illustrative embodiment of the invention.

FIG. 10 depicts a network configuration according to an illustrative embodiment of the invention that can carry out the methods described herein. System 1000 includes one or more clients 1002 and one or more servers 1004 in communication with network (Internet) 1006. A client or a server can have the dual function of client and server.

A client 1002 may be for example, a computer (personal, desktop, laptop etc.), a wireless telephone, a wireless combination device, a personal digital assistant (PDA), or other communication or computational device, a program or a paths or routes of execution inside a single program, routine, process or context, and/or an object executable by a communication or computational device.

Server 1004 can be any hardware device that provides access to files and services. Files for each Internet site are stored and executed on the server. Servers 1004 are attached to the network by some type of an interface.

Client 1002 and server 1004 can be connected to network 1006 by any suitable means, such as a wired connections, wireless connections, and/or an optical connections.

Network 1006 may include one or more networks, such as a local area network (LAN), a wide area network (WAN), a metropolitan area network (MAN), a telephone network, a Public Land Mobile Network (PLMN), an intranet, the Internet, a memory device, or a combination of networks.

Server 1004 includes an MFD 408 accessible and usable by users at clients 1002. MFD 1008 accepts and processes queries from users at client 1002 resulting in providing users with search results responsive to the queries. MFD 1008 has categories 1010. Within each category are lists of manufacturers 1012.

Server 1004 may either permanently or temporarily store information from user sessions.

Figure 11:
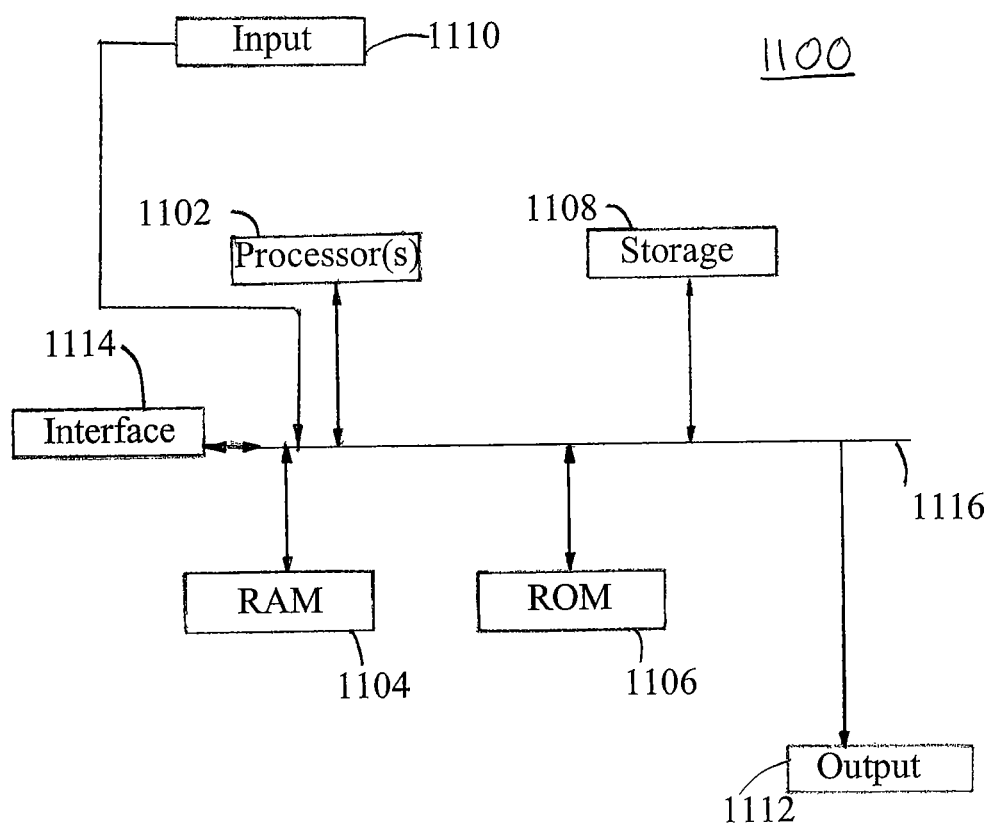
FIG. 11 is an illustrative embodiment of a server 1100 that can be utilized to carry out the methods described herein.

FIG. 11 is an illustrative embodiment of a server 1100 that can be utilized to carry out the methods described herein. The system depicted in FIG. 11 is only one of many configurations possible for an apparatus to carry out embodiments of the invention.

Server 1100 may include, one or more processors 1102, one or more memory devices 1104, 1106, such as a main memory and a read only memory (ROM), a storage device 1108, an input device 1110, an output device 1112, and a communication interface 1114, and a bus 1116.

Processor 1102 may be a central processing unit such as those manufactured by AMD and Intel, such as a microprocessor, or a program that translates another program into a form acceptable by another. Processor 1102 executes instructions contained in a computer-readable medium, such in a memory. Memory devices may include a random access memory (RAM) or other type of dynamic storage device that may store information and instructions for execution by processor 1102. Typically this would constitute main memory 1104. ROM 1106 may be any static storage device that stores static information and instructions for use by processor 1102. Storage device 1108 can include a recording medium and corresponding drive.

Output device 1116 may be for example, a printer, a display, a speaker, etc. Input device 1118 allows a user to input queries or information to a client or server. Numerous input devices may be used, such as keyboards, voice input devices, stylus, and other keypad-type devices.

Communication interface 1120 allows the client and server to communication with other devices or systems if desired, such as within the network if applicable.

A data storage device 1122 may contain software code that can be read into the memory such as the main memory 1104. Such software code can be read into the main memory from another device via interface 1120.

While the invention has been described by illustrative embodiments, additional advantages and modifications will occur to those skilled in the art. Therefore, the invention in its broader aspects is not limited to specific details shown and described herein. Modifications, for example, to the specific types and application of domain knowledge and content of reports and to the computer language, algorithms or software used, may be made without departing from the spirit and scope of the invention. Accordingly, it is intended that the invention not be limited to the specific illustrative embodiments, but be interpreted within the full spirit and scope of the appended claims described herein and their equivalents.

The invention claimed is:

1. A computer based method of evaluating advertising comprising:
   collecting data that is relevant to a target audience from a plurality of advertisers;
   providing a taxonomy for associating one or more uniform resource locators with one or more headings in a plurality of headings based in part on the data collected from the plurality of advertisers;
   providing, over a network to a computational device, a searchable market focused directory of a plurality of uniform resource locators (URLs) categorized under a plurality of headings according to the taxonomy wherein the market focused directory is communicatively coupled to the computational device and performs steps comprising:
      receiving a search query;
      logging the search query into a log file;
      matching the search query with one or more headings in the market focused directory;
      retrieving one or more search results based on the search query, wherein at least one search result comprises one or more of the uniform resource locators categorized under the matched headings; and
      presenting at least a portion of the retrieved search results to the user;
   storing, in a computer readable medium in a memory device, the market focused directory;
   storing executable computer code in a computer processor linked to the computer readable medium in the memory device;
   logging, in a computer readable medium in the memory device, over a specified time period, by executing the computer code using the computer processor, one or more users' actions in using the market focused directory into one or more log files;
   processing, by one or more processors, the log files to derive implicit measures from the users' actions, the implicit measures comprising durations and exit percentages;
   reading, from the computer readable medium in the memory device, the implicit measures into one or more databases;
   aggregating, by the processors, the implicit measures regarding a single URL across a plurality of user sessions;
   averaging, by the processors, the implicit measures regarding a single URL under a single heading across a plurality of user sessions;
   obtaining the user's Internet Protocol address from a server;
   cross-referencing, by the processors, the Internet Protocol address against a database to obtain geolocation information with respect to the user, the geolocation information includes data associated with an organization name of an IP address's owner;
   creating, by the processor, a report of the user behavior comprising the cross-referenced geolocation information data of the user and the averaged implicit measures;
   providing one or more log files containing financial information;
   processing the one or more log files containing financial information to obtain processed financial information suitable to correlate with implicit measures;
   combining the processed financial information suitable to correlate with implicit measures with the geolocation information; and
calculating a return on investment for one or more headings based on the combined geolocation information, implicit measures, and processed financial information.

2. The method of claim 1 further comprising:
   aggregating the implicit measures regarding one or more additional URLs; and
   creating reports of user behavior for each of the one or more URLs.

3. The method of claim 1 further comprising:
   aggregating the implicit measures regarding a plurality of URLs as a group;
   comparing the aggregated implicit measures pertaining to one or more single URLs with the aggregated implicit measures pertaining to the group of URLs; and
   creating a report of the compared aggregated implicit measures.

4. The method of claim 1 further comprising:
   aggregating the implicit measures regarding a plurality of URLs as a group;
   comparing the aggregated implicit measures pertaining to one or more single URLs having a common characteristic with the aggregated implicit measures pertaining to the group of URLs; and
   creating a report of the compared aggregated implicit measures.

5. The method of claim 1 further comprising outputting the report to an output device.

6. The method of claim 1 further comprising outputting the report to a storage device.

7. The method of claim 1 further comprising:
   logging, over a second specified time period, one or more users' actions in using the market focused directory into one or more additional log files;
   processing the additional log files to derive additional implicit measures from the users' actions;

reading the additional implicit measures into one or more databases;

aggregating the additional implicit measures regarding a single URL across a plurality of user sessions;

comparing the aggregated implicit measures to the aggregated additional implicit measures for the same URLs; and creating a report of the comparison.

8. The method of claim 1 further comprising:
reassigning one or more URLs to one or more different headings within the market focused directory.

9. The method of claim 1 further comprising:
providing one or more databases having computed legacy implicit measures; and
comparing legacy implicit measures to present implicit measures.

10. The method of claim 1 further comprising:
providing one or more databases having computed legacy implicit measures; and
comparing legacy implicit measures from a first time period to legacy implicit measures from a second time period.

11. The method of claim 1 further comprising:
analyzing the aggregated implicit measures to determine user behavior related to use of the URL.

12. The method of claim 1 wherein the report of the user behavior further comprises a plurality of aggregated implicit measures under two or more headings.

13. The method of claim 1 further comprising:
averaging, by the processors, the implicit measures regarding one or more additional URLs under the single heading across a plurality of user sessions;
creating, by the processor, a report of the user behavior comprising a comparison of the averaged implicit measures of the single URL and the additional URLs.

14. A non-transitory machine readable storage medium containing an executable code configured to perform the method comprising the steps of:
collecting data that is relevant to a target audience from a plurality of advertisers;
providing a taxonomy for associating one or more uniform resource locators with one or more headings in a plurality of headings based in part on the data collected from the plurality of advertisers;
providing, over a network to a computational device, a searchable market focused directory of a plurality of uniform resource locators (URLs) categorized under a plurality of headings according to the taxonomy wherein the market focused directory is communicatively coupled to the computational device and performs steps comprising:
receiving a search query;
logging the search query into a log file;
matching the search query with one or more headings in the market focused directory;
retrieving one or more search results based on the search query, wherein at least one search result comprises one or more of the uniform resource locators categorized under the matched headings; and
presenting at least a portion of the retrieved search results to the user;
storing, in a computer readable medium in a memory device, the market focused directory;
storing executable computer code in a computer processor linked to the computer readable medium in the memory device;

logging, in a computer readable medium in the memory device, over a specified time period, by executing the computer code using the computer processor, one or more users' actions in using the market focused directory into one or more log files;
processing, by one or more processors, the log files to derive implicit measures from the users' actions regarding one or more URLs, the implicit measures comprising durations and exit percentages;
reading, from the computer readable medium in the memory device, the implicit measures into one or more databases;
aggregating, by the processors, the implicit measures regarding a single URL across a plurality of user sessions;
averaging, by the processors, the aggregated implicit measures for a single URL across a plurality of user sessions;
obtaining the user's Internet Protocol address from a server;
cross-referencing, by the processors, the Internet Protocol address against a database to obtain geolocation information with respect to the user, the geolocation information includes data associated with an organization name of an IP address's owner;
creating, by the processor, a report of the user behavior comprising the cross-referenced geolocation information data of the user and the average durations for the single URL; and
providing one or more log files containing financial information;
processing the one or more log files containing financial information to obtain processed financial information suitable to correlate with implicit measures;
combining the processed financial information suitable to correlate with implicit measures with the geolocation information; and
calculating a return on investment for one or more headings based on the combined geolocation information, implicit measures, and processed financial information.

15. A system comprising:
one or more processors;
one or more memory components functionally coupled to the one or more processors; and
a machine-readable medium having machine-readable program code therein for directing operation of the system;
wherein machine-readable program code is configured to cause the computer to carry out the method comprising the steps of:
collecting data that is relevant to a target audience from a plurality of advertisers;
providing a taxonomy for associating one or more uniform resource locators with one or more headings in a plurality of headings based in part on the data collected from the plurality of advertisers;
providing, over a network to a computational device, a searchable market focused directory of a plurality of uniform resource locators (URLs) categorized under a plurality of headings according to the taxonomy wherein the market focused directory is communicatively coupled to the computational device and performs steps comprising:
receiving a search query;
logging the search query into a log file;
matching the search query with one or more headings in the market focused directory;

retrieving one or more search results based on the search query, wherein at least one search result comprises one or more of the uniform resource locators categorized under the matched headings; and presenting at least a portion of the retrieved search results to the user;

storing, in a computer readable medium in a memory device, the market focused directory;

storing executable computer code in a computer processor linked to the computer readable medium in the memory device;

logging, in a computer readable medium in the memory device, over a specified time period, by executing the computer code using the computer processor, one or more users' actions in using the market focused directory into one or more log files;

processing, by one or more processors, the log files to derive implicit measures from the users' actions regarding one or more URLs, the implicit measures comprising durations and exit percentages;

reading, from the computer readable medium in the memory device, the implicit measures into one or more databases;

aggregating, by the processors, the implicit measures regarding a single URL across a plurality of user sessions;

averaging, by the processors, the aggregated implicit measures for a single URL across a plurality of user sessions;

obtaining the user's Internet Protocol address from a server;

cross-referencing, by the processors, the Internet Protocol address against a database to obtain geolocation information with respect to the user, the geolocation information includes data associated with an organization name of an IP address's owner;

creating, by the processor, a report of the user behavior comprising the cross-referenced geolocation information data of the user and the average durations for the single URL;

providing one or more log files containing financial information;

processing the one or more log files containing financial information to obtain processed financial information suitable to correlate with implicit measures;

combining the processed financial information suitable to correlate with implicit measures with the geolocation information; and calculating a return on investment for one or more headings based on the combined geolocation information, implicit measures, and processed financial information.

16. A computer based method of evaluating advertising comprising:

collecting data that is relevant to a target audience from a plurality of advertisers;

providing a taxonomy for associating one or more uniform resource locators with one or more headings in a plurality of headings based in part on the data collected from the plurality of advertisers;

providing, over a network to a computational device, a market focused directory of a plurality of uniform resource locators (URLs) categorized under a plurality of headings according to the taxonomy wherein the market focused directory is communicatively coupled to the computational device and performs steps comprising:

receiving a search query;

logging the search query into a log file;

matching the search query with one or more headings in the market focused directory;

retrieving one or more search results based on the search query, wherein at least one search result comprises one or more of the uniform resource locators categorized under the matched headings; and presenting at least a portion of the retrieved search results to the user;

storing, in a computer readable medium in a memory device, the market focused directory;

storing executable computer code in a computer processor linked to the computer readable medium in the memory device;

logging, in a computer readable medium in the memory device, over a specified time period, by executing the computer code using the computer processor, one or more users' actions in using the market focused directory into one or more log files;

processing, by one or more processors, the log files to derive implicit measures from the users' actions regarding one or more URLs, the implicit measures comprising durations and exit percentages;

reading, from the computer readable medium in the memory device, the implicit measures into one or more databases;

aggregating, by the processors, the implicit measures regarding a single URL across a plurality of user sessions;

averaging, by the processors, the aggregated implicit measures for a single URL across a plurality of user sessions;

obtaining the user's Internet Protocol address from a server;

cross-referencing, by the processors, the Internet Protocol address against a database to obtain geolocation information with respect to the user, the geolocation information includes data associated with an organization name of an IP address's owner;

creating, by the processor, a report of the user behavior comprising the cross-referenced geolocation information data of the user and the average durations for the single URL;

providing one or more log files containing financial information;

processing the one or more log files containing financial information to obtain processed financial information suitable to correlate with implicit measures;

combining the processed financial information suitable to correlate with implicit measures with the geolocation information; and calculating a return on investment for one or more headings based on the combined geolocation information, implicit measures, and processed financial information.

17. The method of claim 16 further comprising:

comparing the implicit measure of the single URL with implicit measure of one or more of the one or more URLs other than the single URL.

* * * * *